United States Patent [19]

Merle

[11] Patent Number: 4,488,690

[45] Date of Patent: Dec. 18, 1984

[54] CASSETTE WITH CONTROLLED-SPEED ELASTIC BELT

[75] Inventor: Jean-Pierre Merle, Clamart, France

[73] Assignee: Enertec, Montrouge, France

[21] Appl. No.: 474,073

[22] Filed: Mar. 10, 1983

[30] Foreign Application Priority Data

Mar. 17, 1982 [FR] France ............................... 82 04546

[51] Int. Cl.$^3$ ...................... G11B 15/26; G11B 23/06
[52] U.S. Cl. .................................... 242/192; 242/196;
242/199; 360/96.3
[58] Field of Search ........ 242/192, 196, 206, 208–210;
360/90, 96.3, 96.4, 71, 73, 74.2, 74.3

[56] References Cited

U.S. PATENT DOCUMENTS

| | | | |
|---|---|---|---|
| 2,658,398 | 11/1953 | Masterson | 242/192 |
| 3,907,230 | 9/1975 | Merle et al. | 242/192 |
| 4,159,811 | 7/1979 | Grant | 242/192 |
| 4,162,774 | 7/1979 | Bowers | 242/192 |
| 4,172,569 | 10/1979 | Newell | 242/192 |
| 4,199,794 | 4/1980 | Pfost et al. | 360/92 |
| 4,205,808 | 6/1980 | Hurtig et al. | 242/192 |
| 4,209,144 | 6/1980 | Majicek | 242/192 |
| 4,431,146 | 2/1984 | Merle | 242/192 |

FOREIGN PATENT DOCUMENTS

| | | |
|---|---|---|
| 55150 | 6/1982 | European Pat. Off. . |
| 1395958 | 4/1964 | France . |
| 2420817 | 10/1979 | France . |

Primary Examiner—Leonard D. Christian
Attorney, Agent, or Firm—Dale Gaudier

[57] ABSTRACT

In a tape transport apparatus comprising notably a floating roller (12) tangent to reels (5, 6), and an elastic endless belt (11) extending between the floating roller (12) and the reels (5, 6) to form a first loop (11a) surrounding the floating roller (12) and a second loop (11b) engaging on an arc of the periphery of each of the reels (5, 6) to maintain the tension of the accessible portion of the tape (7), this second loop (11b) extending around at least one return roller (13, 14), the invention provides that at least return roller (14) is directly driven by drive means (18, 19), whereby the peripheral speed of the driven return roller (14) and the peripheral speed of the floating roller (12) are maintained in a ratio slightly greater than 1, so as to ensure better tensioning of the tape on the take-up reel.

8 Claims, 4 Drawing Figures

CASSETTE WITH CONTROLLED-SPEED ELASTIC BELT

BACKGROUND OF THE INVENTION

1. Technical Field

The present invention relates to a tape drive system using an endless belt circulating partially in contact with, and supplying tension to, the tape.

2. Prior Art

Apparatus of this type is described in U.S. Pat. No. 3,907,230 to which reference may be made to understand the role of the elastic belt and whose disclosure is incorporated by reference herein.

Although this apparatus is satisfactory even in severe operating conditions, it is apparent that the reels of tape have a tendency to form separate groups of coils when they are stored at low temperature.

It has been discovered, by measurements made on prior art apparatus of the tension of the outermost coil of tape on the take-up reel, that this tension, which varies moreover as a function of the filling of the reel, could, in adverse circumstances, disappear, and even give way to a relaxation or slackness of the tape, with in consequence the formation of gaps separating the groups of coils on the wound reel.

The tape tension of the outermost coil of the take-up reel is influenced, according to a function not yet explained, by the friction of the elastic regulating belt, which engages an arc of the periphery of the said reel. The part of the belt directly concerned in the phenomenon is the part of the second loop of the belt disposed downstream from the floating roller/belt/reel contact point to the (or one of the) belt return roller(s) involved with this second loop.

It has been realised in accordance with this invention that the disappearance of tension in the outermost coil of the tape can be considered as due to a loss of local speed of the elastic belt downstream of the floating roller/belt/reel contact point. In other words, in the prior art arrangements where the belt return roller is a free roller, nothing is able to counteract this local loss of speed, even if the overall belt speed remains constant.

SUMMARY OF THE INVENTION

The object of this invention is to provide an apparatus of the above type which avoids this type of inconvenience. The invention counteracts local braking of the belt by imposing, by means of adequate direct drive of the return roller, an overspeed to maintain the minimum tape tension on the take-up reel in all circumstances at a positive threshold value (for example 10 to 20 grams of tension).

Thus, according to the invention, control of the speed of the elastic belt near the second loop is provided when the peripheral speed of at least one driven return roller and that of the floating roller (serving as a reference) are maintained in a constant ratio slightly greater than 1.

Although the precise values chosen in practice depend on several factors and particularly on the elasticity of the belt, a relative overspeed for the return roller of 1 to 8% with reference to the peripheral speed of the floating roller in general represents a suitable choice. The overspeed is preferably 2%.

It is advantageous to maintain the ratio of the peripheral speeds of the return roller and the floating roller constant by coupling them kinematically to a common motor unit, via a direct or indirect constant kinetic transmission; advantageously, to reduce the weight and inertia of the assembly, transmission by a light and inextensible belt is chosen.

BRIEF DESCRIPTION OF THE DRAWING FIGURES

Two preferred embodiments of tape transport apparatus in accordance with this invention will now be described, by way of example, with reference to the accompanying drawings, in which.

DESCRIPTION OF THE PREFERRED EMBODIMENTS

Figure 1:
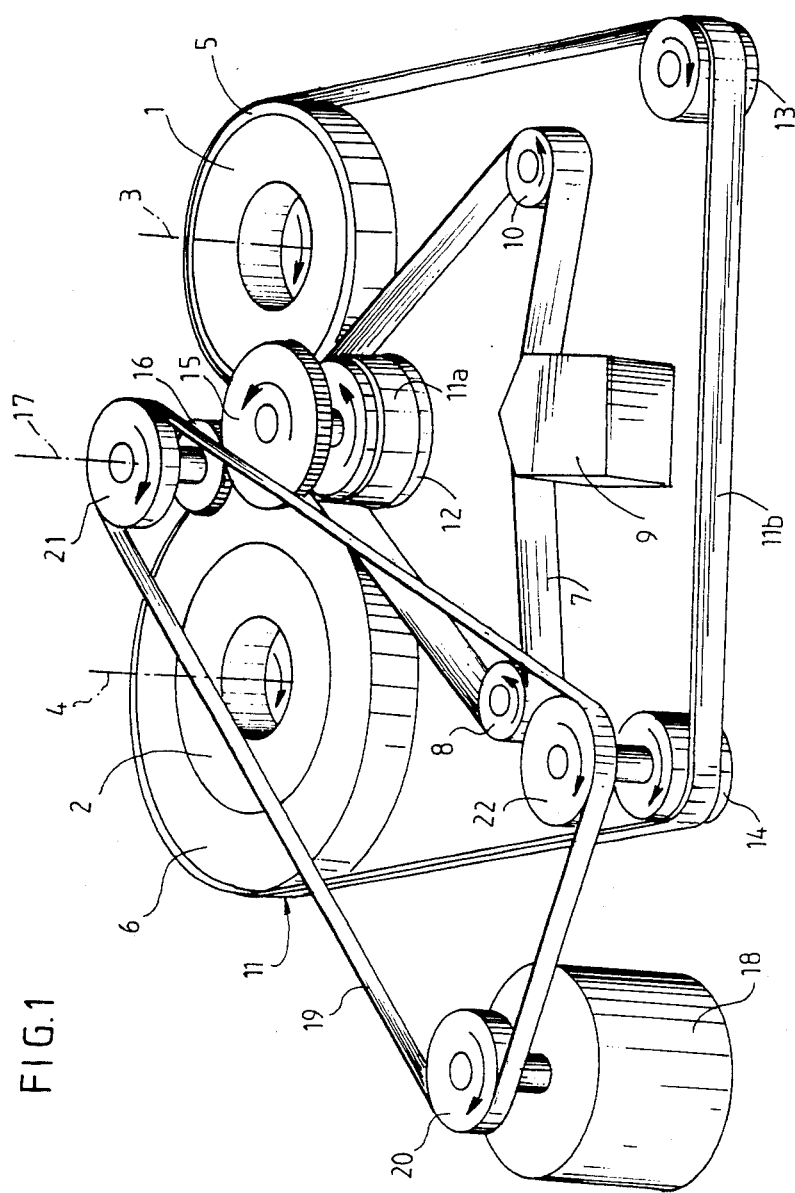
FIG. 1 shows in perspective the essential components of an apparatus in accordance with the invention, in the form of a cartridge with tape drive by the floating roller.
Figure 2:
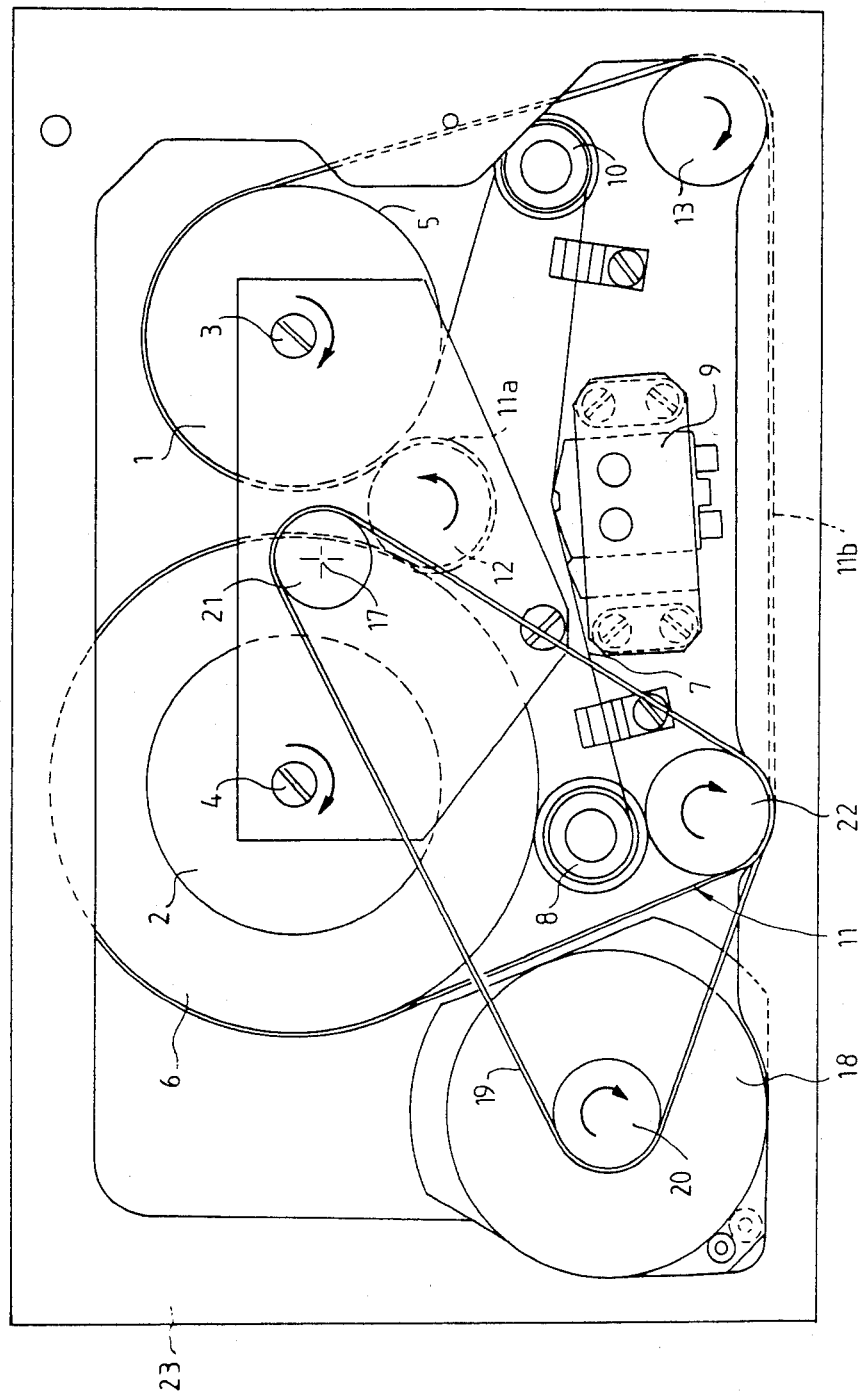
FIG. 2 shows the complete cartridge of FIG. 1, with the cover removed.

In FIGS. 1 and 2 there are shown two spools 1 and 2 rotatably mounted in the same plane about two respective parallel axes 3, 4 secured to a frame 23 of a cassette or cartridge. A magnetic tape is wound around the spools 1 and 2 so as to form two reels 5 and 6 connected by an accessible portion of tape 7.

The accessible portion of tape 7 is unwound (in the illustrated example) from the reel 6 which turns in the direction indicated by the arrow; it passes over a return capstan 8, in front of a magnetic head 9, over a return capstan 10 and winds onto the reel 5.

An endless elastic belt 11 passes between the reels 5 and 6 and a floating roller 12 which the belt keeps in substantially tangential contact with the two reels on the outer (non oxide) side of the tape. The two lines of contact of the floating roller 12/belt 11/reels 5, 6 enable two loops of the belt to be topologically distinguished; a first loop 11a which encircles and urges the floating roller 12 against the reels, and a second loop 11b corresponding to the part of the belt located on the other side of the two lines of contact. This second loop engages an arc of the periphery of each of the reels 5, 6 and is kept taut in passing over two return rollers 13, 14.

In the illustrated example, the two return rollers 13 and 14 are situated, relative to the floating roller 12, on the same side of a plane which contains the axes 3 and 4 of the spools 1 and 2. In comparison to the alternative arrangement comprising placing the return rollers and thus all of the second loop on the other side of the said plane relative to the floating roller, the arrangement chosen has the advantage of providing a greater length of reel arc embraced by the belt, and of enabling the use of an elastic belt 11 of greater length for the same cartridge format, which is desirable for exploiting the elastic properties of the belt.

The floating roller 12 is the drive element of the system, driving the tape by friction via the intermediary of the belt 11, at the two roller 12/belt 11/reels 5, 6 contact points.

As in the arrangement shown in U.S. Pat. No. 4,431,146, whose disclosure is incorporated by reference herein, the roller 12 is connected for rotation to a pinion 15 which is coaxial therewith, and which engages a pinion 16 on an axis 17 fixed relative to the frame of the cassette. The pinion 16, which can be directly keyed on the shaft of a motor, is, in the illustrated example, driven by a motor 18 placed to one side in the cartridge, via the intermediary of an effectively inextensible transmission belt 19 passing over two discs 20 and 21 respectively coaxial with and connected for rotation to the shaft of the motor 18 and the pinion 16.

In order to impart a sufficient minimum tension to the outermost coil of the reel 5, partially embraced by the part of the second loop 11b of the elastic belt 11 just downstream of the roller 12/belt 11/reel 5 contact, with local reductions in speed of the said part of the second loop 11b (that is to say the downstream part of the second loop 11b, in relation to the direction of movement) are counteracted by directly driving the belt 11 at at least one of the two return rollers 13, 14. Experience shows that operating on only one of the rollers is enough, the choice of roller being unimportant and independent of the direction of unwinding of the tape.

To do this, the roller 14 is driven by passing the transmission belt 19 around a disc 22 coaxial with the roller 14 and connected to it for rotation.

The radius of the disc 22 is chosen as a function of the dimensions of the other components to give the desired excess in the peripheral speed of the roller 14 relative to that of the floating roller 12, that is to say to maintain the two speeds in a ratio between 1.01 and 1.08, and, preferably, equal to 1.02.

The elasticity of the material of the belt 11 and that of the taut belt is chosen to be sufficient, as in prior art apparatus, to ensure reliable operation, in time (absence of creep), over large temperature ranges, and to withstand rugged working conditions which induce very strong local shocks over very short time intervals.

It is desirable that the capacity for elastic elongation of the belt before assembly should be at least 50%, and that the capacity for elastic elongation of the installed belt should be at least 10%.

Thus, in two different exemplary embodiments, two belts have been installed, respectively of 1.4 mm unstretched thickness, stretched by 14% (with a reserve of 36%), and of 1 mm unstretched thickness, stretched by 31% (with a reserve of elongation of 19%). The belts did not have the same thickness, on account of the fact that, to obtain the same tape tension, the thickness of the belt should decrease as the elongation increases.

In another exemplary embodiment particularly noted for reliability with time and temperature extremes, a material has been used for the belt 11 having a capacity for elongation of 700% to 800%, the belt being stretched by 30%. The very large reserve of elongation available suits this embodiment for use of the cassette with frequent reversals of the tape.

Figure 3:
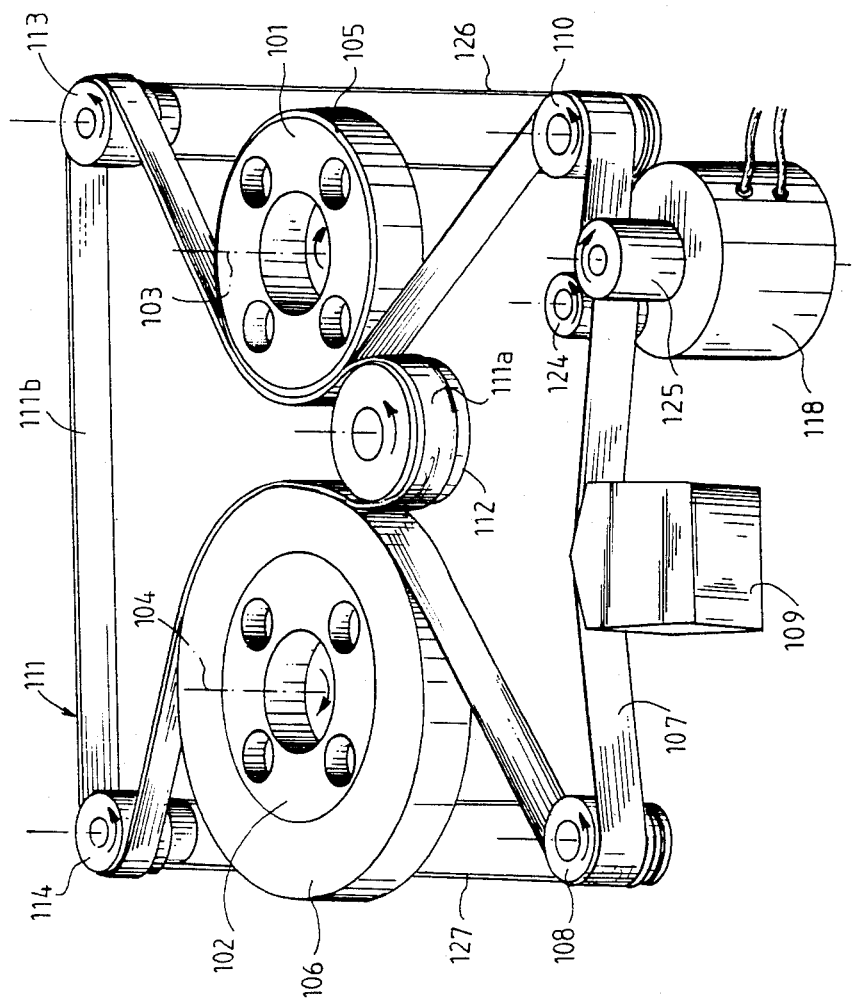
FIG. 3 shows, in similar perspective to FIG. 1, a second apparatus in accordance with the invention in the form of a cassette with direct pinch tape drive.

In FIG. 3, which shows another implementation of the invention in a cassette in which the magnetic tape is directly driven by pinching its accessible portion between two rollers, the components corresponding to those of FIGS. 1 and 2 have the same reference numerals, but increased by 100.

The accessible portion of the tape 107 is unwound from the supply reel 106; it passes over the return capstan 108, in front of the magnetic head 109; it is pinched between a pinch roller 124 and a drive roller 125 mounted on the shaft of the motor 118; passes over the return capstan 110, and is wound onto the take-up reel 105.

The elastic belt 111 forms a first loop 111a around the floating roller 112 and a second loop 111b around two biconical return rollers 113 and 114, located, relative to the floating roller 112, on the other side of a plane which contains the axes 103 and 104 of the spools 101 and 102 of the reels 105 and 106.

Figure 4:
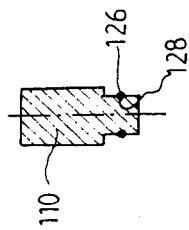
FIG. 4 is a schematic section of a tape return capstan in the cassette of FIG. 3.

In this implementation, the two belt return rollers 113, 114 are each driven by a tape return capstan 110, 108, and at least one transmission belt 126, 127. This belt 126, 127 can be a toroidal belt extending round a groove 128 (see FIG. 4) provided on the rollers 113, 114 or capstans 108, 110 at a level which does not obstruct the movement of the belt or of the tape.

The respective diameters of the grooves 128 of a capstan 108, 110 and of its associated driven roller 114, 113 are calculated as a function of the diameter of the capstan and roller at the level of the tape and the elastic belt 111 to provide the return rollers 114, 113 with the desired overspeed relative to the floating roller 112.

By way of example, with a return capstan 110 of 14 mm diameter at the level of the tape, and 12.5 mm at the level of the groove 128, and a return roller 113 of 14.5 mm diameter at the level of the belt 111 and 11.5 mm at the level of the groove 128, the ratio of the peripheral speeds of the return roller 113 and the floating roller 112 is $12.5/14 \times 14.5/11.5 = 1.13$, ignoring the thickness of the belts and of the tape, as well as possible slipping, notably between the tape 107 and the capstan 110 (108) which should transmit torque to the return roller 113 (or 114). Experience shows however that the above-indicated values give satisfactory results and provide good tension in the magnetic tape on the take-up reel 105.

Although two belt return rollers driven by two tape return capstans have been shown for increased reliability, it would be possible, as in the first embodiment, to drive only one of the capstans, or to place a single transmission belt around one capstan and two rollers, two capstans and one roller, or both capstans and both rollers.

I claim:

1. In a tape transport apparatus of the type for use with a magnetic recorder, and including: a frame; two spools rotatably mounted in a plane and on the frame about two respective parallel axes; a tape wound around at least one of the spools, the tape and the two spools forming two reels connected by an accessible portion of the tape; a floating roller rotatable in the same plane as the reels and substantially tangent to the periphery of each of them; and a taut endless belt, capable of elastic elongation, extending between the floating roller and the reels to define, relative to the floating roller/belt-/reel contact points, a first loop around the floating roller and a second loop engaging an arc of the periphery of each of the reels to maintain the tension of the accessible portion of the tape, this second loop extending around at least one return roller rotatably mounted about an axis fixed relative to the frame; the improvement comprising:

drive means for directly driving at least one of the return rollers in the second loop at a peripheral speed slightly greater than the peripheral speed of the floating roller.

2. Apparatus according to claim 1, wherein the ratio of the speeds is maintained constant.

3. Apparatus according to claim 1, wherein the ratio of the speed of the driven roller to that of the floating roller is between 1.01 and 1.08.

4. Apparatus according to claim 1, further comprising two return rollers disposed, relative to the floating roller, on the same side of a plane containing the axes of the spools and wherein the second loop of the elastic belt extends around said return rollers.

5. Apparatus according to claim 1, wherein the driven return roller, the floating roller, and a common motor unit are kinematically coupled together.

6. Apparatus according to claim 5 further comprising a first pinion connected to rotate integrally with the floating roller, a second pinion rotating about an axis fixed relative to the frame and engaging the first pinion, and a transmission belt kinematically coupling the pinions and the motor unit.

7. Apparatus according to claim 5, further comprising a pinch roller, a drive roller operated by the motor unit to drive the tape, two return capstans, and a transmission belt, and wherein at least one return capstan drives at least one return roller by means of the transmission belt.

8. Apparatus according to claim 7, wherein the return capstans each drive a return roller.

* * * * *